United States Patent
Pasupathy

(10) Patent No.: US 7,376,679 B2
(45) Date of Patent: May 20, 2008

(54) FACILITATING DELAYED BLOCK ALLOCATION IN A DISTRIBUTED FILE SYSTEM

(75) Inventor: Shankar Pasupathy, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 809 days.

(21) Appl. No.: 10/286,778

(22) Filed: Nov. 1, 2002

(65) Prior Publication Data

US 2004/0088336 A1 May 6, 2004

(51) Int. Cl.
*G06F 12/00* (2006.01)
(52) U.S. Cl. .................... 707/205; 707/200; 707/1; 711/153; 711/170; 711/112; 709/201; 709/203
(58) Field of Classification Search .............. None
See application file for complete search history.

(56) References Cited

U.S. PATENT DOCUMENTS

| | | | | |
|---|---|---|---|---|
| 5,619,690 A | * | 4/1997 | Matsumani et al. | 707/200 |
| 5,893,926 A | * | 4/1999 | Saxena et al. | 711/170 |
| 6,032,216 A | * | 2/2000 | Schmuck et al. | 710/200 |
| 6,571,259 B1 | * | 5/2003 | Zheng et al. | 707/205 |
| 6,640,233 B1 | * | 10/2003 | Lewis et al. | 707/205 |
| 2002/0023156 A1 | * | 2/2002 | Chujo et al. | 709/226 |
| 2004/0030822 A1 | * | 2/2004 | Rajan et al. | 711/4 |

OTHER PUBLICATIONS

Operating System Concepts (sixth edition) By Silberschatz et al. (published 2002). pp. 473-474.*
HAMFS file system,by Shinkai, Y. et al. Reliable Distributed Systems, 1999. Proceedings of the 18th IEEE Symposium on Publication Date: 1999. pp. 190-201.*
User Interface for a Parallel File System, Baylor et al. (IBM Technical Disclosure Bulletin, vol. 37, No. 11, Nov. 1994. pp. 477-480).*
Publication entitled "Disk Space Guarantees as a Distributed Resource Management Problem: A Case Study," by Murthy Devarakonda et al., IEEE, 1995, pp. 289-292.

* cited by examiner

*Primary Examiner*—Jasmine Song
*Assistant Examiner*—Kaushikkumar Patel
(74) *Attorney, Agent, or Firm*—Park, Vaughan & Fleming LLP

(57) ABSTRACT

One embodiment of the present invention provides a system that facilitates delayed block allocation in a distributed file system. During operation, the system receives a write command at a client, wherein the write command includes a buffer containing data to be written and a file identifier. In response to receiving the write command, the system reserves a set of disk blocks for the file from a virtual pool of disk blocks allocated to the client. The system also transfers the data to be written to the kernel of the client where the data waits to be transferred to the disk.

12 Claims, 3 Drawing Sheets

FACILITATING DELAYED BLOCK ALLOCATION IN A DISTRIBUTED FILE SYSTEM

BACKGROUND

1. Field of the Invention

The present invention relates to the design of distributed file systems. More specifically, the present invention relates to a method and an apparatus for facilitating delayed block allocation in a distributed file system.

2. Related Art

Distributed file systems are typically based on a client-server model, wherein a client wishing to access a file sends a request to a server to perform a file system operation, such as reading from a file or writing to a file. A file system write operation typically involves a number of steps. The first step usually involves allocating space on disk for the file that is being written to. This ensures that space is available to accommodate data associated with the write operation. At the same time, data for the write operation is moved from the address space of the application into kernel space within the operating system of the client. Next, the system transfers the data from the kernel space of the client to the disk at the server.

The step of allocating space is often very slow because it typically involves communicating with the server to ask the server to allocate space. The server then determines if space is available for the write operation and if so typically allocates space by actually reserving disk blocks for the file being written to. Finally, the server sends an acknowledgement to the client indicating that the allocation was successful.

Note that the step of transferring data from the client to the disk at the server typically has very little impact on write performance because this operation is typically performed asynchronously. Hence, the client application can go on to do other tasks while the data is being transferred to the disk.

Attempts have been made to speed up the allocation step by pre-allocating disk blocks to the client to satisfy write operations. For example, see "Disk Space Guarantees as a Distributed Resource Management Problem: A Case Study", by Murthy Devarakonda, Anada Rao Ladi, Andy Zlotek, and Ajay Mohindra, Proceedings of the IEEE Symposium on Parallel and Distributed Processing, October 1995, pp. 289-292. This paper describes a system that pre-allocates a small number of blocks for a file when the application first creates a file page. As the file grows, the client has to continually return to the server to allocate more disk blocks. While this system speeds up the allocation process, the system suffers from having to continually allocate more disk blocks from the server for the file.

What is needed is a method and an apparatus that facilitates delayed block allocation in a distributed file system without the problems described above.

SUMMARY

One embodiment of the present invention provides a system that facilitates delayed block allocation in a distributed file system. During operation, the system receives a write command at a client, wherein the write command includes a buffer containing data to be written and a file identifier. In response to receiving the write command, the system reserves a set of disk blocks for the file from a virtual pool of disk blocks allocated to the client. The system also transfers the data to be written to the kernel of the client where the data waits to be transferred to the disk.

In one embodiment of the present invention, prior to receiving the write command, the system allocates the virtual pool of disk blocks for the client from the server.

In one embodiment of the present invention, the system reserves sufficient space from the virtual pool of disk blocks to ensure that the buffer and subsidiary data can be written to the disk.

In one embodiment of the present invention, the system maintains a count at the client of disk blocks available in the virtual pool of disk blocks.

In one embodiment of the present invention, the system additionally sends the data from the kernel of the client to the server for writing to the file on disk.

In one embodiment of the present invention, the system sends a count of disk blocks reserved for the file to the server while sending the data from the kernel of the client to the server, thereby updating the server with a latest count of disk blocks reserved for the file.

In one embodiment of the present invention, upon receiving the count of disk blocks reserved for the file, the system allocates additional disk blocks for the client, if necessary, to replenish the virtual pool of disk blocks.

BRIEF DESCRIPTION OF THE FIGS.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer Systems

Figure 1:
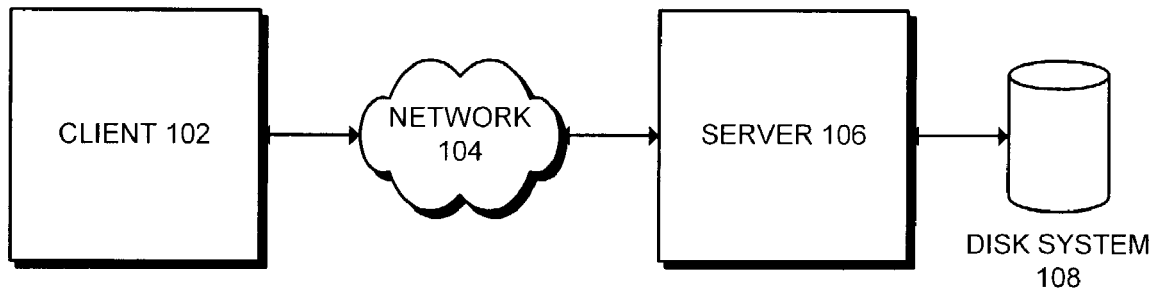
FIG. 1 illustrates a number of computer systems in accordance with an embodiment of the present invention.

FIG. 1 illustrates a client 102 and a server 106 coupled together by a network 104 in accordance with an embodiment of the present invention. Network 104 can generally include any type of wire or wireless communication channel capable of coupling together computing nodes. This includes, but is not limited to, a local area network, a wide area network, or a combination of networks. In one embodiment of the present invention, network 104 includes a private interconnect between client 102 and server 106.

Client 102 and server 106 can generally include any type of computer system, including, but not limited to, a computer system based on a microprocessor, a mainframe computer, a digital signal processor, a portable computing device, a personal organizer, a device controller, and a computational engine within an appliance. Furthermore, client 102 includes a mechanism for making requests upon server 106 for computational and/or data storage resources, and server 106 includes a mechanism for servicing requests from client 102 for computational and/or data storage resources.

In the embodiment of the present invention illustrated in FIG. 1, client 102 is a distributed file system client and server 106 is file server for the distributed file system. In this embodiment, server 106 is attached to a disk system 108, wherein server 106 stores files.

During operation, server 106 determines the number of available disk blocks on disk system 108 and then allocates some of the available disk blocks to client 102. The number of disk blocks that are allocated to client 102 can depend on a number of factors, including: the number of clients coupled to server 106; the number of available disk blocks on disk system 108; and predetermined system parameters.

When client 102 writes a new file to the file system, client 102 first reserves disk blocks from its allocation for the new file. While reserving these disk blocks, client 102 allows space for internal file structures. Client 102 also moves the data from the application's buffer into a kernel buffer within client 102. After reserving the disk blocks from its allocation and after transferring the data into the kernel, client 102 acknowledges the write to the originating application so that the originating application can continue executing.

At some later time, client 102 asynchronously transfers the data to server 106 across network 104 to complete the write operation. While sending this data to server 106, client 102 also sends the number of disk blocks that were reserved for the write operation by the client. This allows server 106 to calculate the number of remaining blocks allocated to client 102. Additionally, server 106 determines the number of disk blocks remaining on disk system 108 and can allocate more disk blocks to client 102, if necessary. Next, client 102 receives an acknowledgement message from server 106 indicating that the file was successfully written to disk. This acknowledgement message can additionally include a new allocation of disk blocks for client 102.

Client

Figure 2:
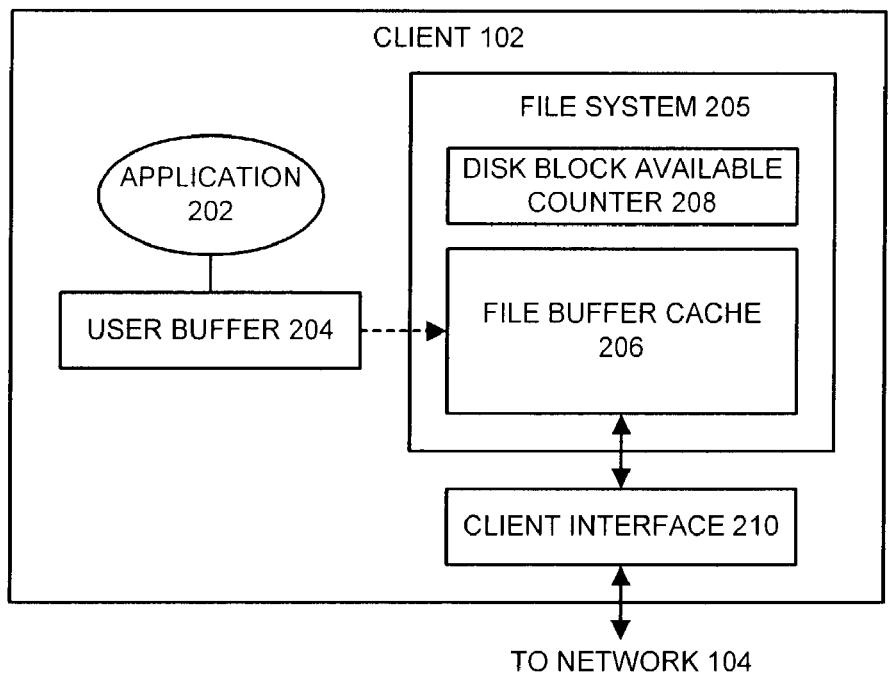
FIG. 2 illustrates a client in accordance with an embodiment of the present invention.

FIG. 2 illustrates client 102 in accordance with an embodiment of the present invention. Client 102 contains application 202, user buffer 204, file buffer cache 206, disk block available counter 208, and client interface 210. User buffer 204 holds data to be written to a file by application 202. Although FIG. 2 only illustrates a single application 202, in general, client 102 can host multiple applications, each with zero or more open files.

File buffer cache 206 contains kernel buffers that are used for holding data from user buffer 204 before the data is transferred to disk system 108 to complete the write operation. Note that user buffer 204 and file buffer cache 206 are replicated within client 102 for each open file. Disk block available counter 208 is used by client 102 to keep track of the number of disk blocks allocated to client 102 by server 106.

During operation, server 106 initially allocates a number of disk blocks to client 102 as described below with reference to FIG. 3. When application 202 writes to an open file, client 102 estimates the number of blocks required for the write operation. This estimate accounts for blocks associated with the file such as directory entries and indirect blocks that point to data blocks. Note that the system typically overestimates the number of blocks required to ensure that the file can be written to disk system 108.

If the estimate is greater than the count in disk block available counter 208, client 102 notifies application 202 that insufficient disk space is available, or alternatively, can request a greater allocation of blocks from server 106. Otherwise, client 102 transfers the write data from user buffer 204 to file buffer cache 206. Client 102 also subtracts the blocks from disk block available counter 208, and notifies application 202 that the file has been sent to disk system 108. Application 202 is then free to continue execution.

After notifying application 202 that the file has been sent to disk system 108, client 102 transfers the write data from file buffer cache 206 to server 106, so that server 106 can write the data to disk system 108. In doing so, client 102 includes the estimated number of blocks along with the data. This allows server 106 to update its counter within server file buffer cache 304 as is described in more detail below with reference to FIG. 3.

When server 106 subsequently acknowledges that the write successfully completed, server 106 can include a count of additional blocks reserved for client 102 in the acknowledgement. Client 102 then adds these additional blocks to disk block available counter 208.

Finally, client interface 210 contains mechanisms that allow client 102 to communicate with server 106. For example, client interface 210 can contain a communication stack, such as a TCP/IP stack, for communicating across network 104 with server 106.

Server

Figure 3:
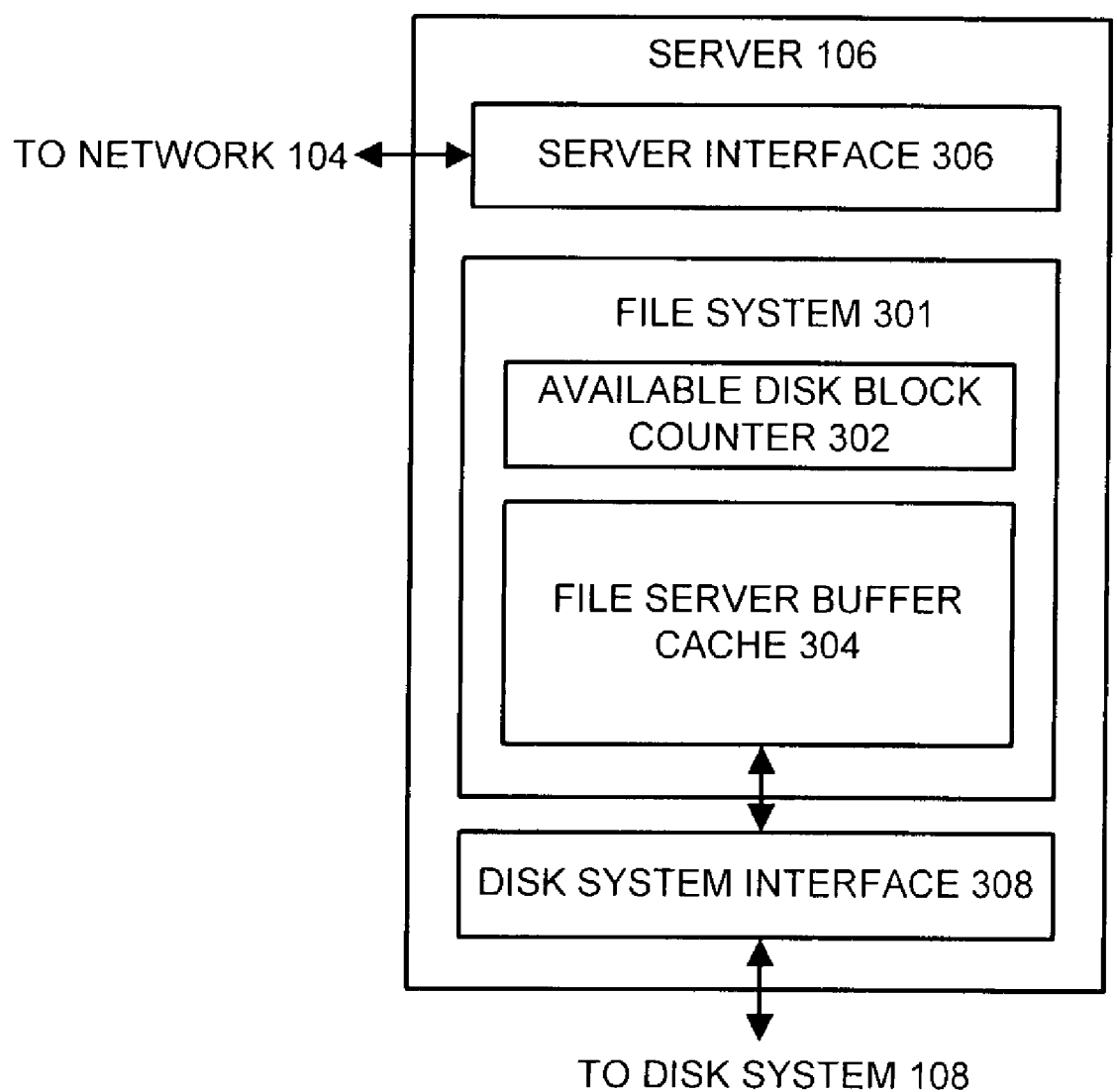
FIG. 3 illustrates a server in accordance with an embodiment, of the present invention.

FIG. 3 illustrates server 106 in accordance with an embodiment of the present invention. As is illustrated in FIG. 3, server 106 contains a file system 205, which includes an available disk block counter 302 and a server file buffer cache 304. Server 106 also contains a server interface 306 and a disk system interface 308.

Available disk block counter 302 keeps track of the number of available disk blocks on disk system 108. Server 106 initially allocates disk blocks to clients, such as client 102, based on a number of factors, including: the number in available disk block counter 302; and the number of clients coupled to server 106.

Server file buffer cache 304 is used by file system 205 as a cache for disk blocks from disk system 108. Note that server file buffer cache 304 is replicated per-client so that each client coupled to server 106 has its own server file buffer cache.

Server 106 uses mechanisms within server interface 306 to communicate with client 102. For example, server interface 306 can include a communication stack, such as a TCP/IP stack, for communicating across network 104 to client 102.

During operation, server 106 sends an initial disk block allocation to client 102. When server 106 subsequently receives data to be written during a write operation, this data includes a count of disk blocks reserved for the write operation. Server 106 then subtracts the count of disk blocks reserved for the write operation from disk block available counter 208 and writes the data to disk system 108 through disk system interface 308.

Server 106 can then allocate additional disk blocks to client 102, if necessary. The current number of disk blocks allocated to client 102 can then be communicated to client 102 in the acknowledgement message that acknowledges successful completion of the write operation.

Process of Pre-allocating Disk Blocks

Figure 4:
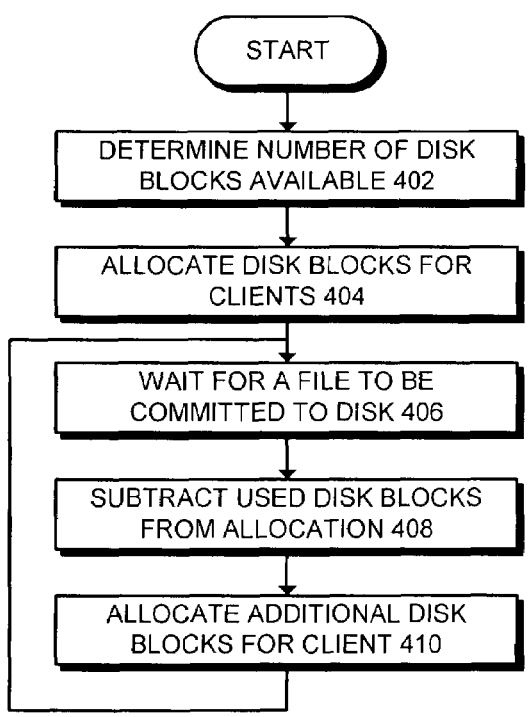
FIG. 4 is a flowchart illustrating the process of pre-allocating disk blocks to the client in accordance with an embodiment of the present invention.

FIG. 4 presents a flowchart illustrating the process of pre-allocating disk blocks to a client in accordance with an embodiment of the present invention. The process starts when disk system interface 308 determines the number of disk blocks available on disk system 108 (step 402). Server 106 then allocates disk blocks for each client coupled to server 106 (step 404). The number of blocks allocated for each client is saved in a server file buffer cache for each client, such as server file buffer cache 304 for client 102. Next, the number of blocks allocated to client 102 is communicated to client 102 across network 104.

After allocating disk blocks to the clients, server 106 waits for a new file to be committed to disk system 108 (step 406). After the new file is committed to disk system 108, server 106 subtracts the number of disk blocks used by the new file from available disk block counter 302 (step 408). Server 106 then allocates additional disk blocks for client 102, if necessary, and notifies client 102 of the new allocation in the message acknowledging that the new file has been successfully written to disk system 108 (step 410). Note that this allocation process can take place asynchronously. The system then returns to step 406 to wait fir another file to be committed to disk.

Process of Writing a File to the Disk System

Figure 5:
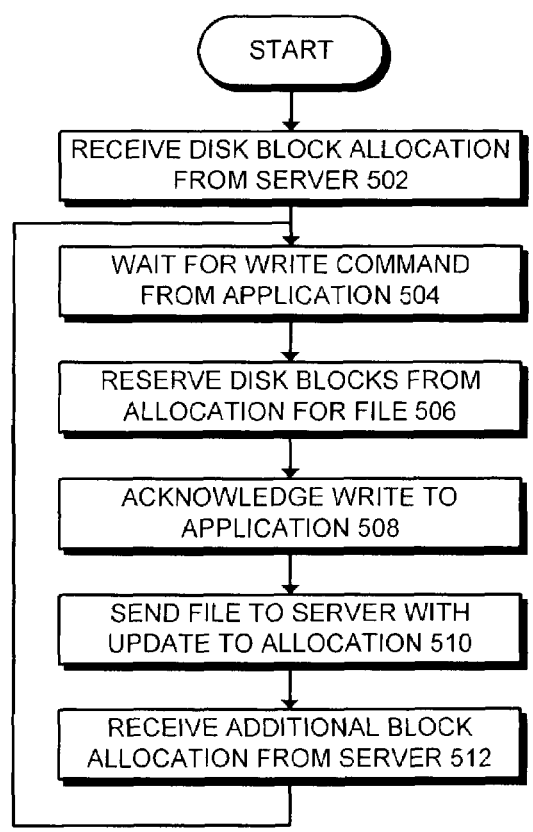
FIG. 5 is a flowchart illustrating the process of writing to a file on disk and receiving a new allocation of disk blocks in accordance with an embodiment of the present invention.

FIG. 5 is a flowchart illustrating the process of writing a file to a disk and receiving a new allocation of disk blocks in accordance with an embodiment of the present invention. The system starts when client 102 receives a disk block allocation from server 106 (step 502). Next, the system waits for a write command from an application, such as application 202 (step 504). Upon receiving a write command, client 102 reserves disk blocks from the allocation for the write command and stores the write data into file buffer cache 206 (step 506). The number of reserved disk blocks is subtracted from disk block available counter 208. Client 102 sends an acknowledgement of completion of the write operation to application 202 (step 508).

After sending the acknowledgement to application 202, client 102 sends the write data and the count of disk blocks reserved for the write operation to server 106 (step 510). Client 102 may subsequently receive an additional disk block allocation from server 106 in the acknowledge message for the write operation (step 512). This new allocation is added to disk block available counter 208 in client 102. The process then returns to step 504 to wait for the next disk write command.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating delayed block allocation in a distributed file system, comprising:
   receiving an allocation of a pool of disk blocks at a client from a server;
   receiving a write command at the client from an application, wherein the write command includes a pointer to a buffer containing data to be written and a file identifier;
   reserving a set of disk blocks for a file on disk from the pool of disk blocks allocated to the client by the server;
   transferring the data to be written from the buffer to a kernel of the client where the data awaits transfer to a disk;
   acknowledging to the application that the data has been written to the file;
   sending the file to the server to be written to the disk, wherein sending the file involves sending a count of the disk blocks that were reserved from the pool of disk blocks at the client to the server;
   asynchronously writing the file from the server to the disk, wherein upon completing the write operation, the server automatically subtracts the count of the reserved disk blocks from a disk block available counter for the client in the server and uses the new value of the disk block available counter to determine an allocation of disk blocks to replace the disk blocks used when writing the file to the disk; and
   receiving an acknowledge message at the client from the server, wherein the acknowledge message includes a notification of the new allocation of disk blocks to be added to the pool of disk blocks.

2. The method of claim 1, wherein reserving the set of disk blocks involves reserving sufficient space from the pool of disk blocks to ensure that the buffer and subsidiary data can be written to the file on disk.

3. The method of claim 1, further comprising maintaining a count at the client of disk blocks available in the pool of disk blocks.

4. The method of claim 1, further comprising sending a count of disk blocks reserved for the file to the server while sending the data from the kernel of the client to the server, thereby updating the server with a latest count of disk blocks reserved for the file.

5. A computer-readable storage medium storing instructions that when executed by a computer cause the computer to perform a method for facilitating delayed block allocation for a file system, the method comprising:
   receiving an allocation of a pool of disk blocks at a client from a server;
   receiving a write command at the client from an application wherein the write command includes a pointer to a buffer containing data to be written and a file identifier;
   reserving a set of disk blocks for a file on disk from the pool of disk blocks allocated to the client by the server;
   transferring the data to be written from the buffer to a kernel of the client where the data awaits transfer to a disk;
   acknowledging to the application that the data has been written to the file;
   sending the file to the server to be written to the disk, wherein sending the file involves sending a count of the disk blocks that were reserved from the pool of disk blocks at the client to the server;
   asynchronously writing the file from the server to the disk, wherein upon completing the write operation, the server automatically subtracts the count of reserved disk blocks from a disk block available counter for the client in the server and uses the new value of the disk block available counter to determine an allocation of disk blocks to replace the disk blocks used when writing the file to the disk; and receiving an acknowledge message at the client from the server, wherein the acknowledge message includes a notification of the new allocation of disk blocks to be added to the pool of disk blocks.

6. The computer-readable storage medium of claim 5, wherein reserving the set of disk blocks involves reserving sufficient space from the pool of disk blocks to ensure that the buffer and subsidiary data can be written to the file on disk.

7. The computer-readable storage medium of claim 5, the method further comprising maintaining a count at the client of disk blocks available in the pool of disk blocks.

8. The computer-readable storage medium of claim 5, the method further comprising sending a count of disk blocks reserved for the file to the server while sending the data from the kernel of the client to the server, thereby updating the server with a latest count of disk blocks reserved for the file.

9. An apparatus for facilitating delayed block allocation for a file system, comprising:
　an allocation receiving mechanism configured to receive an allocation of a pool of disk blocks at a client from a server;
　a command receiving mechanism that is configured to receive a write command at a client including a pointer to a buffer containing data to be written and a file identifier;
　a reserving mechanism that is configured to reserve a set of disk blocks for a file from the pool of disk blocks allocated to the client by the server;
　a transferring mechanism that is configured to transfer the data to be written from a kernel of the client where the data awaits transfer to a disk;
　an acknowledgement mechanism that is configured to acknowledge to the application that the buffer has been written to the file;
　a sending mechanism configured to send the file to the server to be written to the disk, wherein sending the file involves sending a count of the disk blocks that were reserved from the pool of disk blocks at the client to the server;
　a writing mechanism in the server configured to asynchronously write the file from the server to the disk;
　an allocation mechanism in the server, wherein upon the writing mechanism completing the write operation, the allocation mechanism is configured to automatically subtract the count of reserved disk blocks from a disk block available counter for the client in the server and use the new value of the disk block available counter to determine an allocation of disk blocks to replace the disk blocks used when writing the file to the disk; and
　an acknowledge receiving mechanism configured to receive an acknowledge message at the client from the server, wherein the acknowledge message includes a notification of the new allocation of disk blocks to be added to the pool of disk blocks.

10. The apparatus of claim 9, wherein reserving the set of disk blocks involves reserving sufficient space from the pool of disk blocks to ensure that the buffer and subsidiary data can be written to the file on disk.

11. The apparatus of claim 9, further comprising a counting mechanism that is configured to maintain a count at the client of disk blocks available in the pool of disk blocks.

12. The apparatus of claim 9, wherein the sending mechanism is further configured to send a count of disk blocks reserved for the file to the server while sending the data from the kernel of the client to the server, thereby updating the server with a latest count of disk blocks reserved for the file.

* * * * *